United States Patent
Hurd

(10) Patent No.: US 6,535,984 B1
(45) Date of Patent: *Mar. 18, 2003

(54) POWER REDUCTION FOR MULTIPLE-INSTRUCTION-WORD PROCESSORS WITH PROXY NOP INSTRUCTIONS

(75) Inventor: Linda L. Hurd, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/415,436

(22) Filed: Oct. 8, 1999

Related U.S. Application Data

(60) Provisional application No. 60/109,931, filed on Nov. 25, 1998.

(51) Int. Cl.[7] .............................. G06F 1/26; G06F 9/22
(52) U.S. Cl. ....................................... 713/320; 712/248
(58) Field of Search ........................... 702/60; 712/248; 713/320

(56) References Cited

U.S. PATENT DOCUMENTS

| | | | | |
|---|---|---|---|---|
| 5,495,617 A | | 2/1996 | Yamada ..................... 395/750 |
| 5,557,557 A | | 9/1996 | Frantz et al. ................ 364/578 |
| 5,584,031 A | | 12/1996 | Burch et al. ................ 395/750 |
| 5,790,874 A | * | 8/1998 | Takano et al. .............. 712/248 |
| 6,125,334 A | * | 9/2000 | Hurd ........................... 702/60 |
| 6,195,756 B1 | * | 2/2001 | Hurd ........................... 702/60 |
| 6,219,796 B1 | * | 4/2001 | Bartley ....................... 712/214 |

* cited by examiner

Primary Examiner—Thomas Lee
Assistant Examiner—Albert Wang
(74) Attorney, Agent, or Firm—Robert D. Marshall, Jr.; W. James Brady, III; Frederick J. Telecky, Jr.

(57) ABSTRACT

A method of optimizing assembly code of a VLIW processor (10) or other processor that uses multiple-instruction words (20), each of which comprise instructions to be executed on different functional units (11d and 11e) of the processor (10). The instruction words (20) are modified, by modifying NOP instructions to minimize bit changes from cycle to cycle in the machine code. Specifically, a NOP is replaced with a proxy NOP, whose syntax is the same as an adjacent instruction but that is treated as a NOP. This modification results in reduced power dissipation.

6 Claims, 5 Drawing Sheets

| | SLOT 1 | SLOT 2 | SLOT 3 | SLOT 4 | SLOT 5 | SLOT 6 | SLOT 7 | SLOT 8 |
|---|---|---|---|---|---|---|---|---|
| PACKET1 : | b72deda2 | 040c5465 | b51deda1 | 048454e7 | 039d5079 | 04292483 | 04150881 | 05ad907b |
| PACKET2 : | 05292079 | a62d807b | 04950481 | 03a0d083 | 02805665 | 030c56e7 | 610821a1 | 00000000 |
| PACKET3 : | 05ad907b | 04292483 | 04150881 | 039d5079 | 048454e7 | 040c5465 | b51deda1 | b72deda2 |

FIG. 3

| PARALLEL DESIGNATOR (P-BIT) | CONDITIONAL REGISTER FIELD | INSTRUCTION TYPE | FUNCTIONAL UNIT | OPERAND FIELD |
|---|---|---|---|---|
|  | [A2] | ADD | .L1 | A9, A10, A10 |
| \|\| |  | ADD | .L2 | B12, B11, B12 |
| \|\| |  | MPYHL | .M1 | A8, A5, A9 |
| \|\| |  | MPYH | .M2X | A8, B6, B7 |
| \|\| |  | LDW | .D1 | *A0++[2], A5 |
| \|\| |  | LDW | .D2 | *B3++[2], B6 |
| \|\| | [B2] | ADD | .S1 | A2, 1, A2 |
| \|\| |  | NOP |  |  |

OPFIELD
20

FIG. 4A

| .L Unit | .M Unit | .S Unit | .D Unit |
|---|---|---|---|
| ABS | MPY | ADD | ADD |
| ADD | SMPY | ADDK | ADDA |
| AND |  | ADD2 | LD mem |
| CMPEQ |  | AND |  |
| CMPGT |  | B disp | MV |
| CMPGTU |  | B IRP | NEG |
| CMPLT |  | B NRP | ST mem |
| CMPLTU |  | B reg |  |
| LMBD |  | CLR | SUB |
| MV |  | EXT | SUBA |
| NEG |  | EXTU | ZERO |
| NORM |  | MVC |  |
| NOT |  | MV |  |
| OR |  | MVK |  |
| SADD |  | MVKH |  |
| SAT |  | NEG |  |
| SSUB |  | NOT |  |
| SUB |  | OR |  |
| SUBC |  | SET |  |
| XOR |  | SHL |  |
| ZERO |  | SHR |  |
|  |  | SHRU |  |
|  |  | SSHL |  |
|  |  | SUB |  |
|  |  | SUB2 |  |
|  |  | XOR |  |
|  |  | ZERO |  |

FIG. 4B

| ARITHMETIC | MULTIPLY | LOAD/STORE | PROGRAM CONTROL |
|---|---|---|---|
| ABS<br>  absolute value<br>ADD<br>ADDA<br>ADDK<br>ADD2<br>SADD<br>  addition<br>SAT<br>  saturate<br>SSUB<br>SUB<br>SUBA<br>SUBC<br>SUBB<br>  subtraction | MPY<br>MPYH<br>MPYHL<br>MPYLH<br>SMPY<br>  multiply | LD<br>  load<br>MVK<br>MVKH<br>  move<br>ST<br>  store | B<br>BIRP<br>BNRP<br>  branch |

| BIT MANAGEMENT | LOGICAL | PSEUDO/OTHER |
|---|---|---|
| CLR<br>  clear<br>EXT<br>  extract<br>LMBD<br>  leftmost bit detection<br>NORM<br>  normalize<br>SET | AND<br>CMPEQ<br>CMPBT<br>CMPLT<br>  compare<br>OR<br>SHL<br>SHR<br>  shift<br>SSHL<br>  shift w/ saturation<br>XOR | IDLE<br>MV<br>MVC<br>  move<br>NOP<br>ZERO<br>NEG<br>NOT |

```
     CMPGT   .L1    A4, 0, A1        ⎫ EP1
  || MVK     .S1    32767, A0        ⎭       ⎫
     [A1] NORM .L1  A4, A3           ⎫ EP2   ⎬ 20 (FP1)
  || [A1] MVK  .S2  _table, B1       ⎪       ⎪
  || [A1] MVK  .S1  1, A2            ⎭       ⎪
     [A1] AND  .L1  A3, 1, A2        ⎫ EP3   ⎪
  || [A1] SSHL .S1  A4, A3, A4       ⎬       ⎪
  || [A1] MVKH .S2  _table, B1       ⎭       ⎭

[A1] SHR  .S2X  A4, 16, B0      ⎫ EP1   ⎫
  || [A1] SHR  .S1   A4, 1, A4       ⎭       ⎪
     [A1] EXT  .S1   A4, 16, 16, A4  ⎫ EP2   ⎪
  || [A1] SUB  .S2   B0, 16, B0      ⎭       ⎬ 20 (FP2)
          AND  .L1   A4, A0, A4      ⎫ EP3   ⎪
  ||      ADDAH .D2  B1, B0, B1      ⎭       ⎪
     [A1] LDH  .D2   *B1++, B0       ⎫ EP4   ⎪
  || [A1] MVK  .S1   B0, A2          ⎭       ⎭
```

FIG. 5

|          | SLOT 1   | SLOT 2   | SLOT 3   | SLOT 4   | SLOT 5   | SLOT 6   | SLOT 7   | SLOT 8   |
|----------|----------|----------|----------|----------|----------|----------|----------|----------|
| PACKET1: | b72deda2 | 040c5465 | b51deda1 | 048454e7 | 039d5079 | 04292483 | 04150881 | 05ad907b |
| PACKET2: | 05292079 | a62d807b | 04950481 | 03a0d083 | 02805665 | 030c56e7 | 610821a1 | 00000000 |
| PACKET3: | 05ad907b | 04292483 | 04150881 | 039d5079 | 048454e7 | 040c5465 | b51deda1 | b72deda2 |

FIG. 6

```
LOOP:
L14:     SHR     .S1X            B3,    16,     A9              ;* extract s2a
||       SHR     .S2X            A10,   16,     B10             ;* extract t1
||       ADDAW   .D1             A5,    1,      A5              ;* reset x output, (circular)
|| [!B2] LDW     .D2             *B5++[B6],     B10             ;** xi0 = xt[0 * n2], yi0 = yt[0 * n2 + 1]
||       NOP                                                    ; space holder for M2 slot (slot#5)
||       NOP                                                    ; space holder for M1 slot (slot#6)

L15:     ADD2    .S1X            B1,    A8,     A8              ;* xo0 = r1a + t0, yo0 = s1a + t2
||       SUB2    .S2X            B1,    A8,     B1              ;* r1b = r1a - t0, s1b = s1a - t2
||       LDW     .D1             *++A1[A2],                     ;** si1 = w[2 * j], col = w[2 * j + 1];
|| [!B2] LDW     .D2             *B5++[B6],     A8              ;** xi1 = xt[2 * n2], yi1 = yt[2 * n2 + 1]
||       NOP                                                    ;space holder for M2 slot (slot#5)
||       NOP                                                    ;space holder for M1 slot (slot#6)
||       SUB     .L1             A9,    A10,    A12             ;* s1c = s2a - t3
||       ADD     .L2             B3,    B10,    B11             ;* r1c = r2a + t1

...

L23:     ADD2    .S1             A8,    A9,     A8              ;** t0 = xi1 + xi3, t2 = yi1 + yi3
||       ADD2    .S2             B10,   B11,    B1              ;** r1a = xi0 + xi2, s1a = yi0 + yi2
||       ADDAH   .D1             A5,    A7,     A11             ;* copy A-side x store pointer (late stores)
|| [!B1] ADDAW   .D2             B5,    1,      B5              ;*** reset x input, (circular)
||       MPY     .M2             B1,    1,      B2              ;*** j loop twiddle reload test, saved
||       NOP                                                    ;space holder for M1 slot (slot#6)
||       ADD     .L1             A11,   A12,    A15             ;* xa3 = rc3 + ss3
||       SUB     .L2X            A4,    B12,    B4              ;* ya3 = sc3 - rs3
```

FIG. 7

POWER REDUCTION FOR MULTIPLE-INSTRUCTION-WORD PROCESSORS WITH PROXY NOP INSTRUCTIONS

This application claims priority under 35 USC §119(e)(1) of Provisional Application No. 60/109,931, filed Nov. 25, 1998.

TECHNICAL FIELD OF THE INVENTION

This invention relates to microprocessors, and more particularly to methods of using programming instructions in a manner that reduces the power dissipation of a processor.

BACKGROUND OF THE INVENTION

Power efficiency for processor-based equipment is becoming increasingly important as people are becoming more attuned to energy conservation issues. Specific considerations are the reduction of thermal effects and operating costs. Also, apart from energy conservation, power efficiency is a concern for battery-operated processor-based equipment, where it is desired to minimize battery size so that the equipment can be made small and lightweight. The "processor-based equipment" can be either equipment designed especially for general computing or equipment having an embedded processor.

From the standpoint of processor design, a number of techniques have been used to reduce power usage. These techniques can be grouped as two basic strategies. First, the processor's circuitry can be designed to use less power. Second, the processor can be designed in a manner that permits power usage to be managed.

On the other hand, given a particular processor design, its programming can be optimized for reduced power dissipation. Thus, from a programmer's standpoint, there is often more than one way to program a processor to perform the same function. For example, algorithms written in high level programming languages can be optimized for efficiency in terms of time and power. Until recently, at the assembly language level, most optimization techniques have been primarily focused on speed of execution without particular regard to power use.

The programmer's task of providing power efficient code can be performed manually or with the aid of an automated code analysis tool. Such a tool might analyze a given program so to provide the programmer with information about its power usage information. Other such tools might actually assist the programmer in generating optimized code.

U.S. Pat. No. 5,557,557, to Franz, et al., entitled "Processor Power Profiler", assigned to Texas Instruments Incorporated, describes a method of modeling power usage during program execution. A power profiler program analyzes the program and provides the programmer with information about energy consumption. A power profiler is also described in U.S. patent Ser. No. 60/046,811, to L. Hurd, entitled "Module-Configurable, Full-Chip Power Profiler", assigned to Texas Instruments Incorporated, now U.S. Pat. No. 6,125,334.

Once the power requirements of a particular program are understood, the code can be optimized. Automating this aspect of programming requires a code generation tool that can restructure computer code, internal algorithms as well as supporting functions, for minimum power usage.

SUMMARY OF THE INVENTION

One aspect of the invention is a method of optimizing computer programs for power usage. The method is useful for various types of processors that execute "multiple-instruction words" (as defined herein), such as VLIW (very long instruction word) processors and dual datapath processors.

Multiple-instruction words are characterized by having "slots", each word having a different slot for each instruction. Thus, slot 1 contains the first instruction of each word, slot 2 the second, etc. For some processors, each word is executed in its own processor cycle, but this is not necessarily the case.

For a particular listing of program code, the syntax of a series of multiple-instruction words is compared. It is determined whether, from cycle to cycle, there is a change from a non-NOP to a NOP instruction in the same slot. If so, the NOP instruction is modified to minimize bit changes between the NOP instruction and an adjacent instruction, thereby converting the NOP instruction to a proxy NOP instruction. Finally, a proxy NOP code is inserted into the proxy NOP instruction, the code being such that the proxy NOP instruction will be handled as a NOP instruction during program execution.

Thus, the optimization is achieved at the processor architecture level, rather than to high level programming. This permits a processor to be programmed in a manner that is most efficient for that processor. The method can be easily adapted to the characteristics of the processor and its instruction set.

BRIEF DESCRIPTION OF THE DRAWINGS

FIG. 3 illustrates an example of the fetch packet of FIG. 2.

FIG. 4A illustrates the mapping of the instruction types for the processor of FIG. 1 to the functional units in its datapaths.

FIG. 4B is a table describing the mnemonics of FIG. 4A.

FIG. 5 illustrates a fetch packet having multiple execute packets.

FIG. 6 illustrates an instruction sequence that proceeds from a NOP non-NOP to NOP instruction in Slot 8.

FIG. 7 illustrates unoptimized code that is amenable to the optimization process of the invention.

DETAILED DESCRIPTION OF THE INVENTION

The invention described herein is directed to power management for microprocessors. An underlying principle of operation is that the programming provided to the processor can be optimized so as to reduce power usage. Given a particular instruction set, a program using these instructions can be analyzed to detect the presence of non-optimal instruction sequences. These sequences can be modified so that power usage is more efficient, without adversely affecting code functionality.

The method of the invention is most useful with VLIW (very long instruction word) processors, which are characterized by their ability to execute multiple instructions in parallel using different functional units within the processor. The invention is also useful with "dual datapath" processors, which execute two instructions in parallel on two datapaths. Both types of processors execute "multiple-instruction words" in parallel in more than one functional unit.

However, parallelism is not a limitation of the invention, and any processor that fetches and decodes more than one instruction at a time will benefit from the optimization process. As explained below, for such processors, cycle-to-cycle instruction fetching, dispatching, and decoding can be optimized for power if the code is arranged properly.

In light of the preceding paragraph, the term "processor" as used herein may include various types of micro controllers and digital signal processors (DSPs). To this end, the following description is in terms of DSPs—the TMS320 family of DSPs and the TMS320C6x DSP in particular. However, this selection of a particular processor is for purposes of description and example only.

Processor Overview

Figure 1:
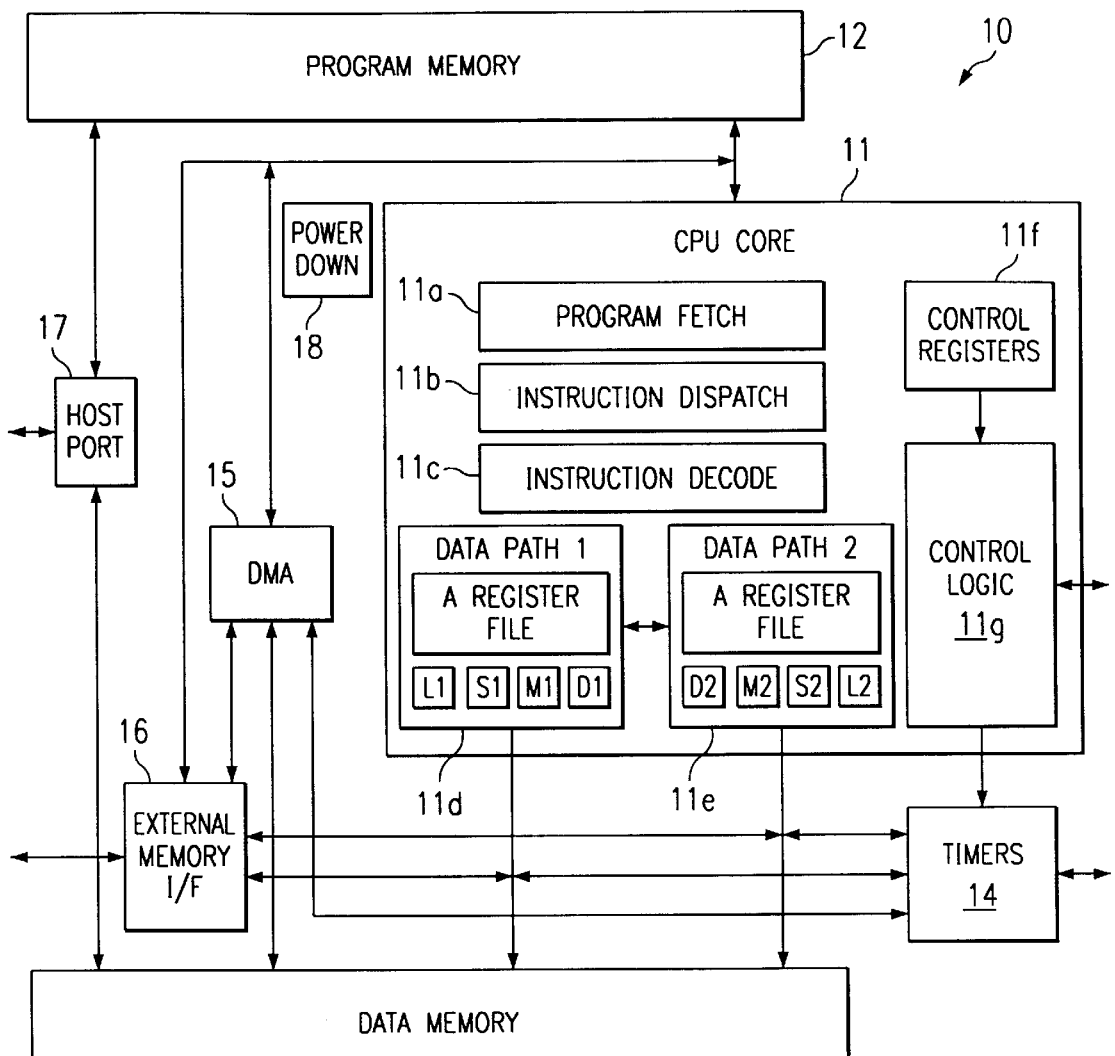
FIG. 1 is a block diagram of a VLIW DSP processor.

FIG. 1 is a block diagram of a DSP processor 10. As explained below, processor 10 has a VLIW architecture, and fetches multiple-instruction words (as "fetch packets") to be executed in parallel (as "execute packets") during a single CPU clock cycle. In the example of this description, processor 10 operates at a 5 nanosecond CPU cycle time and executes up to eight instructions every cycle.

Processor 10 has a CPU core 11, which has a program fetch unit 11a, and instruction dispatch and decode units 11b and 11c, respectively. To execute the decoded instructions, processor 10 has two datapaths 11d and 11e.

Instruction decode unit 11c delivers execute packets having up to eight instructions to the datapath units 11d and 11e every clock cycle. Datapaths 11d and 11e each include 16 general-purpose registers. Datapaths 11d and 11e each also include four functional units (L, S, M, and D), which are connected to the general-purpose registers. Thus, processor 10 has eight functional units, each of which may execute one of the instructions in an execute packet. Each functional unit has a set of instruction types that it is capable of executing.

The control registers 11f provide the means to configure and control various processor operations. The control logic unit 11g has logic for control, test, emulation, and interrupt functions.

Processor 10 also comprises program memory 12, data memory 13, and timers 14. Its peripheral circuitry includes a direct memory access (DMA) controller 15, external memory interface 16, host port 17, and power down logic 18. The power down logic 18 can halt CPU activity, peripheral activity, and timer activity to reduce power dissipation. These power down modes, as well as features of processor 10 other than the features of the present invention, are described in U.S. patent Ser. No. 60/046,811, now U.S. Pat. No. 6,125,334, referenced in the Background and incorporated herein by reference.

Processor 10 executes RISC-like code, and has an assembly language instruction set. In other words, each of its VLIWs comprises RISC-type instructions. A program written with these instructions is converted to machine code by an assembler. Processor 10 does not use microcode or an internal microcode interpreter, as do some other processors. However, the invention described herein could be applicable regardless of whether RISC-like instructions control the processor or whether instructions are internally interpreted to a lower level.

In the example of this description, eight 32-bit instructions are combined to make the VLIW. Thus, in operation, 32-bit instructions are fetched eight at a time from program memory 12, to make a 256-bit instruction word. The "fetch packet" is comprised of these eight instructions fetched from memory 12.

Figure 2:
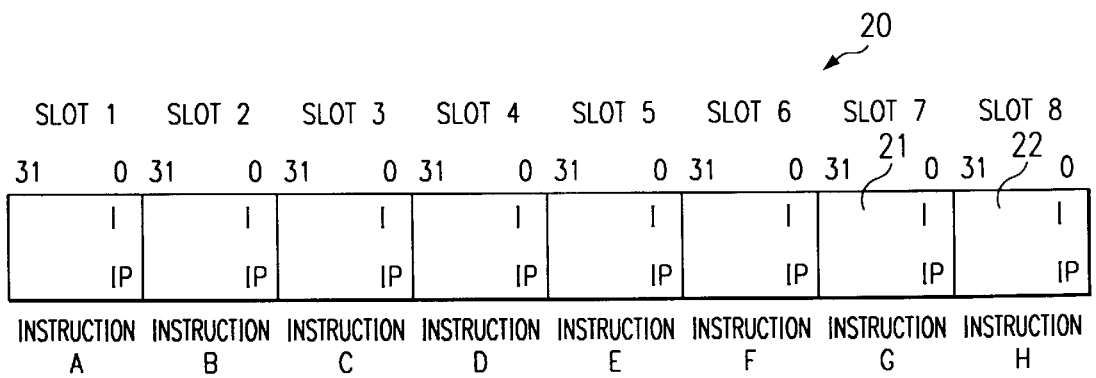
FIG. 2 illustrates the basic format of a fetch packet used by the processor of FIG. 1.

FIG. 2 illustrates the basic format of the fetch packet 20 used by processor 10. Each of the eight instructions in fetch packet 20 is placed in a location referred to as a "slot" 21. Thus, fetch packet 20 has Slots 1, 2, . . . 8.

Processor 10 differs from other VLIW processors in that the entire fetch packet is not necessarily executed in one CPU cycle. All or part of a fetch packet is executed as an "execute packet". In other words, a fetch packet can be fully parallel, fully serial, or partially serial. In the case of a fully or partially serial fetch packet, where the fetch packet's instructions require more than one cycle to execute, the next fetch can be postponed. This distinction between fetch packets and execute packets permits every fetch packet to contain eight instructions, without regard to whether they are all to be executed in parallel.

For processor 10, the execution grouping of a fetch packet 20 is specified by a "p-bit" 22 in each instruction. In operation, instruction dispatch unit 11b scans the p-bits, and the state of the p-bit of each instruction determines whether the next instruction will be executed in parallel with that instruction. If so, its places the two instructions are in the same execute packet to be executed in the same cycle.

FIG. 3 illustrates an example of a fetch packet 20. Whereas FIG. 2 illustrates the format for the fetch packet 20, FIG. 3 illustrates an example of instructions that a fetch packet 20 might contain. A fetch packet 20 typically has five to eight instructions, and the fetch packet 20 of FIG. 3 has seven. Each instruction has a number of fields, which ultimately are expressed in bit-level machine code.

The || characters signify that an instruction is to execute in parallel with the previous instruction, and is coded as p-bit 22. As indicated, fetch packet 20 is fully parallel, and may be executed as a single execute packet.

The square brackets [] signify a conditional instruction, surrounding the identifier of a condition register. Thus, the first instruction in FIG. 3 is conditioned on register A2 being nonzero. A ! character signifies "not", so that a condition on A2 being zero would be expressed as [!A2]. The conditional register field comprises these identifiers.

The opfield contains an instruction type from the instruction set of processor 10. Following the instruction type is the designation of the functional unit that will execute the instruction. As stated above in connection with FIG. 1, each of the two datapaths 11d and 11e has four functional units. These functional units are L (logical), S (shift), M (multiply), and D (data). The opfield thus has the syntax [instruction type]. [functional unit identifier].

Some instruction types can be performed by only one functional unit and some can be performed by one of a number of them. For example, only the M unit can perform a multiply (MPY). On the other hand, an add (ADD) can be performed by the L, S, or D unit. The correspondence of functional units to instructions is referred to herein as their "mapping".

FIG. 4A is a table illustrating, for processor 10, the mapping of instruction types to functional units. It is useful for an understanding of the examples set out below in connection with code optimization. FIG. 4B illustrates the description of each mnemonic.

The mapping of functional units to instruction types determines which instructions can be executed in parallel, and therefore whether a fetch packet will become more than one execute packet. For example, if only the M unit can perform a multiply (MPY), an execute packet could have two MPY instructions, one to be executed by each of the two datapaths 11d and 11e. In contrast, the L, S, and D units are all capable of executing an add (ADD), thus an execute packet could contain as many as six ADD instructions.

Referring again to FIG. 3, the instruction's operand field follows the opfield. Depending on the instruction type, the operand field may identify one or more source registers, one or more constants, and a destination register.

FIG. 5 is an example of code having multiple execute packets per fetch packet 20. In this example, there are two fetch packets 20. The first fetch packet 20 is executed in three execute packets, EP1, EP2, and EP3. The second fetch packet 20 is executed in four execute packets, EP1, EP2, EP3, and EP4.

To generalize the above-described processor architecture, an executable instruction word, i.e., an execute packet, contains up to eight instructions to be executed in parallel during a CPU cycle. Each instruction in an execute packet uses a different one of the functional units (L, D, S or M) of datapaths 11d and 11e. The instruction mapping determines which instruction types can be duplicated within an execute packet.

The use of instruction words in this manner lends itself to unique techniques for power optimization. As explained below, within an instruction word, instructions can be arranged so that, for each slot, changes from cycle to cycle are minimized.

Power Optimization with Proxy NOPs

FIGS. 6 and 7 illustrate a code optimization process in accordance with the invention. The process is explained below, together with an example of code optimization in accordance with that process. The code example is consistent with the architecture of processor 10 as described above in connection with FIGS. 1–5. Specifically, the examples are consistent with a processor 10 that uses fetch packets that may be divided into execute packets, and special considerations for this distinction between fetch packets and execute packets are noted.

However, the invention is equally useful for processors whose fetch packets are the same as the execute packets, as well as for processors that do not use "packets" in the conventional sense. The common characteristic of the code to be optimized is that it has "multiple-instruction words". The term "multiple-instruction word" is used to signify a set of instructions, where the instructions within the set are grouped at some point within the processor for processing (which may include fetching, dispatching, decoding, executing, or some combination of these functions), and where the executing is by different functional units of the processor. The "multiple-instruction word" may be structured as a fetch packet, or as an execute packet, or it may have a structure different from a conventional packet structure.

U.S. patent Ser. No. 06/068656, now U.S. Pat. No. 6,195,756 entitled "Power Reduction for Multiple-Instruction-Word Processors by Modification of Instruction Words", is directed to a number of techniques for finding and minimizing cycle-to-cycle bit changes in the binary representation of the assembly code. Each technique is directed to finding and minimizing a different category of bit changes. In a general sense, the code is scanned for various syntax features as opposed to functional features. Various syntax changes can be made without substantially affecting the overall functionality in terms of the number and type of instructions. Because there are fewer bit changes and the functionality is substantially the same, the result is less node switching when instructions are fetched from program memory and when they are decoded and dispatched. This in turn, reduces power dissipation.

The optimization technique that is the subject of the present invention is directed to customizing NOP (no operation) instructions so as to minimize bit changes. As explained below, "normal" NOP instructions can be replaced with proxy NOP instructions that minimize the bit changes. A reserved bit or set of bits in the conditional field can be used as a proxy NOP code to indicate that the instruction is equivalent to a NOP.

FIG. 6 illustrates an instruction sequence that proceeds from a non-NOP to a NOP to a non-NOP instruction in slot 8. For processor 10, the NOP instruction is a series of 32 zeros if the p-bit is not set or of 31 zeros and a one if the p-bit is set. Non-NOP instructions are a combination of 32 ones and zeros. An instruction sequence that proceeds from a non-NOP to NOP instruction or vice versa requires anywhere from 0 to 32 bit state changes in program memory.

FIG. 7 illustrates an example of unoptimized assembly code. After executing the packet of L23, the code loops back to L14. In Slot 7, the code appears as:

packet Slot #7
   L23 ADD.L1 A11,A12,A15
   L14 NOP
   L15 SUB.L1 A9,A10,A12

The proxy NOP to be placed in L14 would appear as [N] ADD.L1 A11,A12,A15. The same result could be obtained by modifying the NOP fields to conform to the succeeding instruction rather than the preceding instruction. The N is a reserved bit in the conditional field of the instruction, referred to herein as a proxy NOP code.

The insertion of the proxy NOP code, results in the proxy NOP instruction being handled as a NOP. A control bit can be set so that the decode circuitry does not send any execute/enable signals to the particular functional unit. It should be understood that the proxy NOP code can be any character(s) that translates to appropriate binary commands.

As a result of the conversion of the NOP to a proxy NOP, power is reduced as fewer bits change state in the operand field and opfield. Generally, the use of proxy NOPs reduces power to drive instructions from program memory, dispatch and decode instructions, and in the functional unit itself such as in the case of a SHIFT instruction.

The above-described optimization technique could be performed manually by an assembly code programmer. However, in more sophisticated embodiments of the invention, one or more of the techniques are performed automatically, with a code generation tool. Such a tool would be programmed to detect code sequences in which a particular technique is applicable and to perform the optimization called for by that technique.

In theory, any NOP can be replaced by a proxy NOP. However, an automated optimization technique could make use of a special algorithm that determines whether a conventional NOP or a proxy NOP would produce a lower number of bit changes. Such an algorithm might generate different combinations of patterns for proxy NOPs and select the pattern that represents the minimum number of bit changes. The optimization can be applied to "intended NOPs" as well as "packed NOPs", where the latter are NOPs used to fill up fetch packets.

The insertion of proxy NOPs can be preceded by a process of locating and aligning NOP instructions as described in U.S. patent application Ser. No. 60/068,656, now U.S. Pat.

No. 6,195,756, referenced above. This places them in the same slot from instruction to instruction, thereby permitting the use of the above-described proxy NOPs.

Other Embodiments

Although the present invention has been described in detail, it should be understood that various changes, substitutions, and alterations can be made hereto without departing from the spirit and scope of the invention as defined by the appended claims.

What is claimed is:

1. A method of reducing power usage by a processor that processes multiple-instruction words, said words having corresponding slots, one slot for each instruction in a word, said words being processed during one or more processor cycles, comprising the steps of:

comparing the syntax of a series of said multiple-instruction words;

determining whether, from cycle to cycle, there is a change from a non-NOP to a NOP instruction in the same slot;

modifying said NOP instruction to minimize bit changes between said NOP instruction and an adjacent instruction, thereby converting said NOP instruction to a proxy NOP instruction; and inserting a proxy NOP code in said proxy NOP instruction, such that said proxy NOP instruction is handled as a NOP instruction during program execution.

2. The method of claim 1, wherein:

each instruction includes an opfield; and said modifying step is performed by modifying an operand field to match that of said adjacent instruction.

3. The method of claim 1, wherein:

each instruction includes an operand field; and said modifying step is performed by modifying an opfield to match that of said adjacent instruction.

4. The method of claim 1, wherein:

each instruction includes a conditional register field; and said proxy NOP code is placed in a conditional register field of said NOP instruction.

5. The method of claim 1, wherein:

said modifying step includes selecting the one of a normal NOP instruction or a proxy NOP instruction which produces the lower number of bit changes in a sequence of instructions including the change from a non-NOP instruction to a NOP instruction.

6. The method of claim 1, wherein:

said modifying step includes generating a plurality of proxy NOP instructions, and converting said NOP instruction into one proxy NOP instruction selected from said plurality of proxy NOP instruction which produces the lower number of bit changes in a sequence of instructions including the change from a non-NOP instruction to a NOP instruction.

* * * * *